(12) United States Patent
Conner et al.

(10) Patent No.: US 8,759,470 B2
(45) Date of Patent: Jun. 24, 2014

(54) MIXED POLYCYCLOALIPHATIC AMINES (MPCA) AND MPCA ALKYLATES

(75) Inventors: Mark David Conner, New Tripoli, PA (US); Gamini Ananda Vedage, Bethlehem, PA (US); Peter Andrew Lucas, Allentown, PA (US); Courtney Thompson Thurau, Harleysville, PA (US); Richard V. C. Carr, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 13/216,687

(22) Filed: Aug. 24, 2011

(65) Prior Publication Data

US 2011/0301318 A1 Dec. 8, 2011

Related U.S. Application Data

(62) Division of application No. 12/196,606, filed on Aug. 22, 2008, now Pat. No. 8,026,318.

(51) Int. Cl.
*C08G 18/32* (2006.01)

(52) U.S. Cl.
USPC .............................................. 528/68; 528/85

(58) Field of Classification Search
CPC ...................................................... C08G 18/32
See application file for complete search history.

(56) References Cited

U.S. PATENT DOCUMENTS

| | | | |
|---|---|---|---|
| 3,849,360 A | | 11/1974 | Farah et al. |
| 4,124,569 A | | 11/1978 | Bock et al. |
| 4,226,737 A | | 10/1980 | Kluger et al. |
| 5,034,435 A | * | 7/1991 | Squiller et al. ................. 523/415 |
| 5,280,091 A | | 1/1994 | Dubowik et al. |
| 5,312,886 A | * | 5/1994 | House et al. ..................... 528/64 |
| 5,616,677 A | * | 4/1997 | Primeaux et al. ............... 528/66 |
| 5,814,689 A | | 9/1998 | Goldstein et al. |
| 5,888,279 A | | 3/1999 | Salmonsen et al. |
| 5,942,593 A | | 8/1999 | Pudleiner et al. |
| 5,961,730 A | * | 10/1999 | Salmonsen et al. ............... 134/4 |
| 6,403,752 B1 | | 6/2002 | House et al. |
| 6,797,789 B2 | | 9/2004 | Davis et al. |
| 2006/0058491 A1 | | 3/2006 | Cork |

FOREIGN PATENT DOCUMENTS

| | | |
|---|---|---|
| DE | 198 11 471 A1 | 9/1999 |
| DE | 19811471 | 9/1999 |
| EP | 0 939 091 A | 9/1999 |
| EP | 0939091 | 9/1999 |
| JP | 53-037619 A | 4/1978 |
| WO | 02/102869 A | 12/2002 |
| WO | 02102869 | 12/2002 |

OTHER PUBLICATIONS

Mark L. Posey et al, New Secondary Amine Chain Extenders for Aliphatic Polyurea Materials, Polyurea Dev. Assoc. 2003 Annual Conf., Aug. 2003, Reno NV.
Polyurea, from Wikipedia, free encyclopedia, Apr. 2008, http://en.wikipedia.org/wiki/Polyurea, pp. 1-4.
Polyurethane, from Wikipedia, free encyclopedia, Apr. 2008, http://en.wikipedia.org/wiki/Polyurethane, pp. 1-20.
Dudley J. Primeaux II, Spray Polyurea Elastomers Offer Performance Advantages, Modern Paint and Coatings Jun. 1991, pp. 46-54.
Jay A. Johnston et al, Physical Properties of Aromatic Polyurea Elastomer Coatings After Exposure to Extreme Conditions, Poly. Expo 2002, pp. 291-306.
J. Reddinger, et al, Turning the Properties of Polyurea Elastomer Systems via Raw Material Selection and Processing Parameter Modulation, PU Conference 2001, p. 1-7.

* cited by examiner

*Primary Examiner* — Randy Gulakowski
*Assistant Examiner* — Jeffrey Washville
(74) *Attorney, Agent, or Firm* — Rosaleen P. Morris-Oskanian

(57) ABSTRACT

Mixed polycycloaliphatic amines (MPCA) and alkylates thereof (MPCA alkylates), methods for making mixed polycycloaliphatic MPCA amines and MPCA alkylates thereof, as well as polymeric compositions, such as spray-applied polyurea coating compositions, comprising said mixed amines MPCA and MPCA alkylates thereof are described herein. In one embodiment, the polymeric composition comprises an isocyanate component, and a resin component comprising an organic compound having the following Formula I:

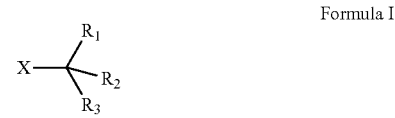

Formula I where $R_1$, $R_2$ and $R_3$ are each independently selected from a hydrogen atom, an alkyl group comprising from 1 to 20 carbon atoms, an aryl group comprising from 3 to 12 carbon atoms, an aralkyl group comprising from 3 to 12 carbon atoms and combinations thereof, provided that there is at least one alkyl group within Formula I, and X is a methylene bridged polycycloaliphatic amine (MPCA).

6 Claims, No Drawings

MIXED POLYCYCLOALIPHATIC AMINES (MPCA) AND MPCA ALKYLATES

CROSS REFERENCE TO RELATED APPLICATIONS

This application is a divisional application of U.S. patent application Ser. No. 12/196,606, filed on Aug. 22, 2008.

BACKGROUND OF THE INVENTION

Disclosed herein are mixed polycycloaliphatic amines (MPCA) and alkylates thereof (MPCA alkylates), methods for making mixed polycycloaliphatic MPCA amines and MPCA alkylates thereof, as well as polymeric compositions, such as spray-applied polyurea coating compositions, comprising said mixed MPCA and MPCA alkylates.

The term "polymeric compositions", as used herein, describes compositions comprising 2 or more repeating units. Specific examples of polymeric compositions include, but are not limited to, polyureas, polyurethanes, and urea/urethane hybrid elastomer or coating compositions. Certain polymeric compositions such as polyurea elastomers are rapid cure coatings that have gel times that can be as short as 2-3 seconds. Because of its rapid cure speed, these polyurea coatings can be applied over a broad range of temperatures, are relatively moisture insensitive, and can be used on a wide variety of substrates. In addition to its application benefits, the fast cure speed may allows users and facility owners to return areas to service much faster than with other coatings systems, saving time and money for both the contractors and owners. These benefits, among others, have all led to significant growth in the polyurea industry over the last two decades.

One problem in the industry has been a lack of standardization in terminology; recent attempts to standardize the terminology include more or less arbitrary definitions of "pure polyurea", hybrid "polyurea-polyurethane" and "polyurethane" coatings. The impetus behind the attempted standardization is the effect of cure speed and reactivity on both final properties of the cured system as well as the sensitivity of the system to moisture during the spray application process. These delineations focus on the chemistry of the reaction process (as opposed to the chemistry in the manufacture of the components), where the cure speed and potential moisture sensitivity issues arise.

There are many examples of polyurea compositions in both the patent and scientific literature as well as many commercial systems that uses these coatings. Polyurea coatings can be formed by reacting an isocyanate component with an isocyanate reactive component such as, for example a resin blend. The isocyanate component may be generally comprised of a monomer, polymer, or any variant reaction of isocyanates, quasi-prepolymer, prepolymer, or combinations thereof. The prepolymer or quasi-prepolymer can be made of an amine-terminated polymer resin, a hydroxyl-terminated polymer resin, or combinations thereof. The isocyanate reactive component or resin blend may be generally comprised of amine-terminated polymer resins, amine-terminated curing agents, hydroxyl-terminated polymer resins, hydroxyl-terminated curing agents, and combinations thereof. The term "curing agent" as used herein describes a compound or mixture of compounds that is added to a polymeric composition to promote or control the curing reaction. In certain systems, the term "curing agent" may also describe chain extenders, curatives, or cross-linkers. The resin blend may also include additives or other components that may not necessarily react with the isocyanate contained therein as well as, in certain systems, catalysts.

While the compositions of these polyurea coatings vary, the isocyanate component within the composition may be generally divided into two broad classes: aromatic and aliphatic. The systems defined as aromatic may use an aromatic polyisocyanate, such as 4,4'-methylene bis isocyanto benzene (MDI), and isomers and adducts thereof. The MDI adducts referred to in both the patent and scientific literature include MDI prepolymers, quasi-prepolymers (which have a mixture of prepolymer and high free MDI monomer level and may be prepared in-situ) and mixtures of MDI prepolymers and quasiprepolymers with other MDI monomer streams. MDI adducts are sometimes prepared using an MDI monomer with a high 2,4'-MDI isomer level to reduce the reactivity and increase the pot life. For spray applied applications, the later property may be referred to as gel time and/or tack-free time. The composition may also employ one or more additional aromatic components such as, for example, the following curing agents, diethyl-toluenediamine (DETDA) or dithiomethyl-toluenediamine (ETHACURE® E300).

When the isocyanate component in the composition is aliphatic, the curing agents that are used as the isocyanate reactive component are generally also aliphatic in nature. Examples of aliphatic curing agents include, but are not limited to, dialkyl-methylene bis cyclohexylamine (which are marketed under the brandname CLEAR LINK®) or the aspartic ester products such as Desmophen® from Bayer Material Science LLC. The remaining ingredients within the polymeric composition, which can be added to either or both the isocyanate and resin blend components and can be aromatic or aliphatic in nature, may include any number of additional components. Examples of additional ingredients in the polymeric composition may include for, example, a poly-alkylene oxide (i.e., polypropylene oxide) reacted into the polyisocyanate component to provide a quasi-prepolymer and one or more amine-terminated polypropylene oxides of functionality 2.0 or higher, such as for example, the JEFFAMINE® brand of curing agents.

Typical applications for polyurea compositions may include, for example, bedliners for pick-up trucks, pipe or pipeline coatings and linings, bridge coatings, joint fill and caulk, tank coatings and linings to contain chemical and industrial liquids, marine coatings, roof coatings, waste water treatment linings, manhole and sewer linings, as well as a number of additional applications falling under the general category of "protective coating" or liner. The polyurea composition may be applied as sheets, fibers, foams, adhesives, coatings, elastomers, or other methods. Depending upon its end-use and its application, it is desirable that the polyurea composition exhibits at least one of the following properties: corrosion resistance, abrasion resistance, ease of application, durability, fast cure time, adherence, high tensile strength, high elongation, moisture insensitivity, flexibility, and combinations thereof. Depending upon the end-use, it is also desirable that the polymeric composition exhibit stability upon exposure to a variety of aggressive environments such as, for example, acids, bases, hydrocarbons, fuels, oxygenates, etc.

One of the more desired properties for polyurea compositions is improved chemical resistance. For example, U.S. Publ. No. 2006/0058491 describes a polyurethane-polyurea polymer having a polyisocyanate component and an isocyanate-reactive component that includes at least one organic compound having a mercaptan functional moiety such as a polysulfide. U.S. Pat. No. 6,797,789 describes phenolic/polyurea co-polymers that contain phenolic resins for improved chemical resistance performance.

There is a recognized need for a new family of curing agents which provide the end-user a tool to specifically tailor a wide-variety of cure-profiles and which generally improve the overall formulating latitude of polymeric coating. Further, there may be a need in the art to provide a family of curing agents that may provide improved chemical resistance.

BRIEF SUMMARY OF THE INVENTION

Mixed polycycloaliphatic amines (MPCA) and alkylates thereof (MPCA alkylates) which may be used as curing agents and polymeric compositions comprising these mixed MPCA amines, MPCA alkylates, and combinations thereof which may be used, for example, in plural component coating applications, are described herein. In one embodiment, there is provided polymeric composition comprising: an isocyanate component, and a resin component that reacts with at least a portion of the isocyanate component to provide the polymeric composition wherein the resin component comprises at least one polycycloaliphatic amine selected from the group consisting of 4,4'-methylenebis(cyclohexylamine), 4-[(4-aminocyclohexyl)methyl]-cyclohexanol, 2,4-bis[(4-aminocyclohexyl)methyl]-cyclohexylamine, 4-[4-aminocyclohexyl)methyl-N-4-[4-[(4-aminocyclohexyl)methyl]-cyclohexyl]-cyclohexylamine, 4-(p-aminobenzyl)cyclohexylamine, 2,4-bis(4'-aminocyclohexyl)aniline, and 2,4'-bis(4''-aminocyclohexyl)-2',4-methylenedianiline, an alkylate of the at least one polycycloaliphatic amine, and mixtures thereof.

In another embodiment, there is provided a method for preparing a polymeric composition, the method comprising: providing an isocyanate component; providing a resin component comprising a curing agent comprising at least one polycycloaliphatic amine selected from the group consisting of 4,4'-methylenebis(cyclohexylamine), 4-[(4-aminocyclohexyl)methyl]-cyclohexanol, 2,4-bis[(4-aminocyclohexyl)methyl]-cyclohexylamine, 4-[4-aminocyclohexyl)methyl-N-[4-[(4-aminocyclohexyl)methyl]cyclohexyl]-cyclohexylamine, 4-(p-aminobenzyl)cyclohexylamine, 2,4-bis(4'-aminocyclohexyl)aniline, and 2,4'-bis(4''-aminocyclohexyl)-2',4-methylenedianiline, an alkylate of the at least one polycyloaliphatic amine, and mixtures thereof; and mixing the at least a portion of the isocyanate component with at least a portion of the resin component wherein the at least a portion of the resin component reacts with the at least a portion of the isocyanate component to provide the polymeric composition wherein the volume ratio of the isocyanate component to the resin component in the polymeric composition is any ratio in the range of from about 1.00:1.00 to about 1.20:1.00.

In yet another embodiment, there is provided a polymeric composition comprising: an isocyanate component, and a resin component comprising an organic compound having the following Formula I:

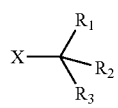

Formula I wherein $R_1$, $R_2$ and $R_3$ are each independently selected from a hydrogen atom, an alkyl group comprising from 1 to 20 carbon atoms, an aryl group comprising from 3 to 12 carbon atoms, an aralkyl group comprising from 3 to 12 carbon atoms and combinations thereof, provided that there is at least one alkyl group within Formula I, and X is a polycycloaliphatic amine.

In a further embodiment, there is provided a polymeric composition comprising: an isocyanate component, and a resin component comprising an organic compound having the following Formula II:

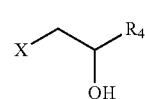

II where substituent $R_4$ is selected from a hydrogen atom, an alkyl group comprising from 1 to 20 carbon atoms, an aryl group comprising from 3 to 12 carbon atoms, an aralkyl group comprising from 3 to 12 carbon atoms and combinations thereof, and X is a methylene bridged polycycloaliphatic amine.

In yet another embodiment, there is provided a polymeric composition comprising: an isocyanate component, and a resin component comprising an organic compound having the following Formula III:

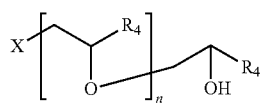

III where substituent $R_4$ is selected from a hydrogen atom, an alkyl group comprising from 1 to 20 carbon atoms, an aryl group comprising from 3 to 12 carbon atoms, an aralkyl group comprising from 3 to 12 carbon atoms and combinations thereof, and X is a methylene bridged polycycloaliphatic amine.

In a still further embodiment, there is provided a method for preparing a polymeric composition, the method comprising: providing an isocyanate component; providing a resin component comprising an organic compound having the following Formula I:

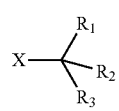

Formula I where $R_1$, $R_2$ and $R_3$ are each independently selected from a hydrogen atom, an alkyl group comprising from 1 to 20 carbon atoms, an aryl group comprising from 3 to 12 carbon atoms, an aralkyl group comprising from 3 to 12 carbon atoms and combinations thereof, provided that there is at least one alkyl group within Formula I, and X is a methylene bridged polycycloaliphatic amine; and mixing the at least a portion of the isocyanate component with at least a portion of the resin component wherein the at least a portion of the resin component reacts with the at least a portion of the isocyanate component to provide the polymeric composition wherein the volume ratio of the isocyanate component to the resin component in the polymeric composition is any ratio in the range of from about 1.00:1.00 to about 1.20:1.00.

DETAILED DESCRIPTION OF THE INVENTION

Disclosed herein are mixed polycycloaliphatic amines (MPCA) and alkylates thereof (MPCA alkylates) that may, for example, can provide polymeric compositions with improved chemical resistance, or alternatively, allow manufacturers and/or end-users to introduce changes to known formulations to improve the chemical resistance of an existing product. In the later embodiment, the mixed curing agents described herein allows a manufacturer and/or end-user to improve existing formulations for specific applications with chemical resistance demands ranging from modest to aggressive, as measured by standard analytical techniques. Also described herein are polymeric compositions comprising an isocyanate component and a resin component wherein at least a portion of the resin component is reactive to the isocyanate component and wherein the resin component comprises a mixed polycycloaliphatic amine and/or the alkylated derivatives of the mixed polycycloaliphatic amines as a curing agent.

Polymeric compositions with increased cross-link density generally demonstrate improved chemical resistance as measured by, for example, reduced swell, better retention of physical properties after exposure to chemicals (such as acidic environments, basic environments, certain solvent environments, etc.), or both. While not intending to be bound by theory, increased cross-link density can be affected by increased hard-segment content, chemical cross-linking with amine-based curing agents with functionality greater than 2, or combinations thereof. It is believed that the chemical resistance of the polymeric composition may be improved by the greater degree of cross-linking that results from the use of these mixed aromatic and aliphatic curing agents such as those described herein.

In certain embodiments, the polymeric composition described herein comprises 2 or more components: an isocyanate component and a resin component. The resin component may also be referred to herein as the isocyanate reactive component wherein at least a portion of the isocyanate reactive component reacts with at least a portion of the isocyanate component. In these embodiments, the polymeric compositions, such as polyurea and polyurethane polymers, comprise an isocyanate component and a resin component, which are designated herein as an A-side and a B-side, respectively. The volume ratio of isocyanate component and resin component present within the polymeric composition may be any ratio in the range of from about 10.00:1.00 to about 1.00:10.00. Examples of such ratios include but are not limited to any one of the following: about 10.00:1.00, 9.00:2.00, 8.00:3.00, 7.00:4.00, 6.00:5.00, 5.00:5.00, 4.00:10.00, 3.00:9.00, 2.00:8.00, 1.00:10.00. In certain preferred embodiments, such as those applications which relate to impingement mixing, the volume ratio of isocyanate component to resin component is any ratio in the range of from about 1.00:1.00 to about 1.20:1.00 isocyanate to resin. For example, the volume ratio of isocyanate component to resin component may be about 1.00:1.00, or about 1.20:1.00, or about 1.00:1.20. Examples of suitable polymeric compositions containing isocyanate and resin components are those described in U.S. Pat. No. 6,403,752 which is incorporated herein by reference. The isocyanate component may comprise a polyisocyanate which can be a monomer, a quasi prepolymer, a full prepolymer, a blend of polyisocyanates, or combinations thereof. In embodiments wherein the isocyanate component comprises a full prepolymer, a full prepolymer may be formed when the polyisocyanate is pre-reacted with a certain amount of polyamine or a polyol such that each reactive site of the polyamine or the polyol is covalently attached to one reactive site of a polyisocyanate. In these embodiments, the remaining unreacted sites of the polyisocyanate may be free to react further with the resin component or B-side within the polymeric composition. In embodiments where the isocyanate component comprises a quasi prepolymer, a certain amount of polyamine or polyol may be present in the resin or B-side that is less than that necessary to form a full prepolymer is used. The result is a mixture of prepolymer and a relatively higher amount of unreacted polyisocyanate compared to a full prepolymer. In polymeric compositions wherein the isocyanate component comprises a polyisocyanate that is monomeric or uses a quasi prepolymer, the isocyanate-reactive components in the resin component may comprise a blend of higher molecular weight components (which add flexibility to the final polymer) and lower molecular weight components (which tend to add to the strength properties of the final polymer). The term "higher molecular weight" is intended to indicate compounds having a molecular weight of greater than 400; the term "lower molecular weight" is intended to indicate compounds having a molecular weight of 400 or less. In certain embodiments, the isocyanate component may be comprised of at least 2 isocyanate groups. In these or other embodiments, it could be comprised of a dimer or trimer such as a hexamethylene diisocyanate (HDI) trimer.

As previously mentioned, the polymeric composition comprises an isocyanate component. The isocyanate component of the composition may comprise an aliphatic isocyanate, an aromatic isocyanates, a prepolymer, a quasi-prepolymer derived from an isocyanate, and combinations thereof. The isocyanate may be comprised of aromatic isocyanates, aliphatic isocyanates, or combinations thereof. In embodiments where the isocyanate component contains one or more aromatic isocyanates, examples of aromatic isocyanate compounds include, but are not limited to, methylene-bis-diphenylisocyanate (MDI) isomers, toluenediisocyanate isomers, phenylene diisocyanate isomers, sylylene diisocyanate isomers and Napthylene diisocyantes isomers. In one particular embodiment, the composition comprises a MDI isocyanate. In other embodiments, the composition comprises an aliphatic isocyanate in addition to, or in lieu of, the aromatic isocyanates. Examples of the aliphatic isocyanates include, but are not limited to, hexamethylene diisocyanate (HDI), isophorone diisocyanate (IPDI), dicyclohexylmethane diisocyanate (one isomer mixture is marketed by Bayer under the trade name DESMODUR® W, for example). These isocyanate monomers may be modified and/or adducted to provide various desirable characteristics to the A-side of the formulation. It is understood that the isocyanate component is not intended to be limited to the above exemplary polyisocyanates and other isocyanates may be used.

In one particular embodiment, the isocyanate monomer is modified by preparing a prepolymer or quasi-prepolymer of the isocyanate with an isocyanate-reactive moiety with isocyanate-reactive functionality >=2. Polyols are commonly used and can include polypropylene glycol (PPGs), polytetramethylene glycols (PTMEGs), polyethylene glycols (PEGs), polyesters, polycaprolactones and blends and copolymers of these types of isocyanate-reactive materials. As used herein, the term "polyol" refers to a single polyol or a blend of polyols. Diamines, thioethers and other isocyanate-reactive materials may also be used either alone or in combination.

The isocyanate component or A-side may also further contain various other additives which may be reactive or non-reactive to the isocyanate contained therein and/or the resin.

The additional reactive components may include components such as, but not limited to, reactive diluents (e.g., propylene carbonate), plasticizers, fillers, and pigments. Non-isocyanate-reactive species are used as pigments, fillers, adhesion promoters and viscosity modifiers, for example. Other additives may include, but are not limited to, stabilizers and plasticizers.

In certain embodiments, the amount of isocyanate component that is used to produce the polymeric composition is dependent on the amount and the equivalent weight of the amine or curative portion of the formulation. In these embodiments, the range of equivalents of isocyanate groups to active hydrogen atoms contained in the mixed polycycloaliphatic amines described herein may range from 0.75 to 1.25, or from 0.90 to 1.1, or from 0.95 to 1.05.

In certain embodiments, the functionality of the isocyanate component may range from 2 to about 3. Examples of such ranges include, but are not limited to, any one of the following or combinations of the following: 2 to 2.1; 2 to 2.3; 2 to 2.5; 2 to 2.8; 2.1 to about 3.0; 2.3 to about 3.0; 2.5 to about 3.0; 2.8 to about 3.0; and combinations thereof.

The polymeric compositions described herein may further comprise oligomeric polyisocyanates (e.g., dimers, trimers, polymeric, etc.) and modified polyisocyanates (e.g., carbodiimides, uretone-imines, etc.) may also be used with the curing agents described herein in the resin side. In these embodiments, the polyisocyanates may be used "as-is" or pre-reacted.

As previously mentioned, the polymeric composition also comprises an isocyanate reactive component or a resin component or B-side component. The resin component may be composed of components where at least a portion of the resin reacts with at least a portion of the isocyanate component contained therein and various other additives such as, but not limited to, pigments, adhesion promoters, fillers, light stabilizers, catalyst, and combinations thereof. The isocyanate component(s) within the polymeric blend discussed herein are reacted or cured with a resin blend comprising the curing agent disclosed herein or the mixed polycycloaliphatic amine and/or the alkylated derivatives of the mixed polycycloaliphatic amines as a curing agent. Curing may occur either with the diamine alone, or in combination with other polyamines or polyols such as those described herein.

In one particular embodiment, the curing agent is an alkylated mixture of methylene-bridged poly(cyclohexyl-aromatic) amines. More specifically, the polycycloaliphatic primary amines can be generally chemically characterized as poly(primary)aminocycloaliphatic substituted cycloaliphatic amines, aromatic amines, methylene bridged cycloaliphatic amines, methylene bridged aromatic amines, or methylene bridged mixed cycloaliphatic/aromatic amines, where poly refers to at least two substituents and a maximum limited only by the possible open chemical positions. Examples of suitable aminoalkylcyclohexylamines include, 4,4'-methylenebis(cyclohexylamine), 4-[(4-aminocyclohexyl)methyl]-cyclohexanol, 2,4-bis[(4-aminocyclohexyl)methyl]-cyclohexylamine, 4-[4-aminocyclohexyl)methyl-N-[4-[(4-aminocyclohexyl)methyl]cyclohexyl]-cyclohexylamine, and the like. Commercial mixtures of aminoalkylcyclohexylamines and aminoaralkylcyclohexylamines are sold under the trade name "Mixed Polycycloaliphatic Amines" (MPCA) by the assignee of the present application. In one embodiment, the methylene-bridged poly(cyclohyexyl-aromatic amines) are the residue obtained from the distillation of a mixture of poly(cyclohexyl aromatic) amines formed by the hydrogenation of crude methylene dianiline or cured di(4-amino-3-methylcyclohexyl)methane. Further examples of suitable mixed polycycloaliphatic amines that are used as a curing agent in a polymeric composition are described, for example, U.S. Pat. No. 5,280,091. Useful alkylates of these mixed polycycloaliphatic amines (MPCA) include organic compounds having the following general Formula I:

Formula I where $R_1$, $R_2$ and $R_3$ are each independently selected from a hydrogen atom, an alkyl group comprising from 1 to 20 carbon atoms, an aryl group comprising from 3 to 12 carbon atoms, an aralkyl group comprising from 3 to 12 carbon atoms and combinations thereof, provided that there is at least one alkyl group within Formula I, and X is a methylene bridged poly(cycloaliphatic-aromatic) amine (MPCA). If $R_1$, $R_2$ and/or $R_3$ are alkyl groups, the alkyl groups are either linear or branched alkyl groups comprising from 1 to 20, or from 2 to 12, or from 2 to 6 carbon atoms. Representative alkyl groups include methyl, ethyl, propyl, isopropyl, butyl, isobutyl, secondary butyl, tertiary butyl, and the various isomeric pentyl, hexyl, heptyl, octyl, nonyl, and decyl groups. Any one or all of alkyl group, aralkyl group, and/or aryl group may be saturated or unsaturated. As previously mentioned, the structure in Formula I is attached to X which is a polycycloaliphatic amine such as MPCA. In the Formula I, substituents $R_1$, $R_2$ and $R_3$ are attached to X or MPAC at a nitrogen atom that that initially had one or two hydrogen atoms attached. In certain embodiments, the curing agent is one or more non-alkylated MPCAs. In other embodiments, the curing agent is one or more alkylated MPCAs. In still further embodiments, the curing agent is a mixture of one or more non-alkylated MPCA and one or more alkylated MPCA.

In certain embodiments, the alkyl group, the aryl group, or the aralkyl group may be substituted with one or more hetero atoms such as, but not limited to, O, N, and S. In these or other embodiments, the alkyl group, the aryl group, or the aralkyl group may be substituted with one or more aromatic groups. In these embodiments, it may be preferably that the substituents within the organic compound having the above Formula I are not detrimental to the reaction that provides the polymeric composition such as, but not limited to, reductive alkylation. For example, ethers may be present within the compound provided that they do not react; however, thioethers may interfere with the catalyst required to perform the reductive alkylation. The substituent groups that may be present within the organic compound without interfering with the catalyst will be known to those skilled in the art.

In one particular embodiment, the mixed polycycloaliphatic amines are prepared using a reductive alkylation method. The reductive alkylation preparation method may use, for example, aldehydes or ketones to provide the hydrocarbon fragments in the reaction product. The identity of the aldehyde or ketone will determine the identities of each R substituent or $R_1$, $R_2$ and $R_3$ provided in Formula I and in the resulting reaction product. The structures below, or A, B, and C, are various embodiments of the mixed polycyloaliphatic amines described herein and not intended to be limited thereto. These embodiments illustrate the hydrocarbon fragment which may be formed by using acetone, methyl isobutyl ketone and benzadehyde in the preparation of the MPAC reaction product or structures A, B and C, respectively.

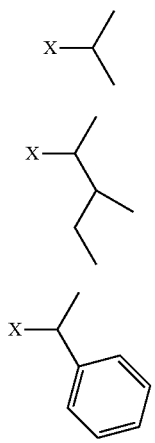

A

B

C

In one embodiment, any one of the R substituents or $R_1$, $R_2$, or $R_3$ in the reaction product may independently contain oxygen moieties in the form of ethers.

In another embodiment, the alkylate group may also be composed of fragments from the reaction with an epoxy group, such as, for example, ethylene oxide (EO) or propylene oxide (PO) as a component of the alkylation process to form a reaction product having the following Formula II:

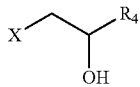

II

In the above Formula II, substituent $R_4$ is selected from a hydrogen atom, an alkyl group comprising from 1 to 20 carbon atoms, an aryl group comprising from 3 to 12 carbon atoms, an aralkyl group comprising from 3 to 12 carbon atoms and combinations thereof, and X is a methylene bridged polycycloaliphatic amine (MPCA). In one embodiment, $R_4$ may be, for example H, if an ethylene oxide is used in the alkylation process. In another embodiment, $R_4$ may be, for example, $CH_3$ if a propylene oxide is used in the alkylation process.

In a further embodiment, $R_4$ may be, for example, a short oligomer that is formed from, for example, ethylene oxide (EO) or propylene oxide (PO) in the alkylation process to provide a reaction product having the following Formula III. In these embodiments, the reaction of the amine with the EO or PO does not necessarily require a reductive alkylation reaction. The resultant reaction product or compound having Formula III are isocyanate reactive but are significantly slower than the amine-isocyanate reaction. In Formula III, substituent $R_4$ is selected from a hydrogen atom, an alkyl group comprising from 1 to 20 carbon atoms, an aryl group comprising from 3 to 12 carbon atoms, an aralkyl group comprising from 3 to 12 carbon atoms and combinations thereof, X is a methylene bridged polycycloaliphatic amine (MPCA), and n is a number ranging from 1 to 10:

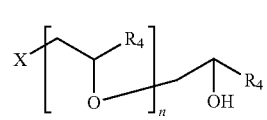

III

In the above Formula III, the length of the oligomer is not limited thereto. In certain embodiments, the desired reaction product will have an average of no more than about one unit attached to each nitrogen atom contained within the reaction product. In this or other embodiments, n denotes a number ranging from 1 to 3 which may be attributable to the relatively higher reaction rate with N than with O. In this particular embodiment, the hydroxyls do not participate in the polyurea reaction, since their reaction rate will be much lower than the amines, retaining a designation of pure polyurea. The term "pure polyurea" as used herein is a polyurea elastomer whose starting components are isocyanate functional on one side and amine functional on the other. The amine functional side of the elastomer is further defined as having only minimal intentionally added hydroxyl functionality that is reactive with the isocyanate. The "minimal" amount may range from about 0 to about 20% added hydroxyl.

In one particular embodiment, the MPCA mixed alkylates comprises a mixture of amines reflecting the composition of the distillate residue. In this embodiment, the major components of the residue are the following which also includes the weight percent range based upon the overall mixture of curing agent:

| Ingredient: | CAS No. | Range (%) |
|---|---|---|
| 1. Di(4-aminocyclohexyl)methane ("PACM") | 1761-71-3 | 0-10% |

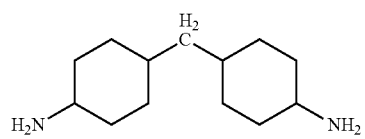 [SMILES: NC1CCC(CC2CCC(N)CC2)CC1]

| 2. 4-[(4-aminocyclohexyl)methyl]cyclohexanol ("PACM—OH") | 52314-58-6 | 0-25% |

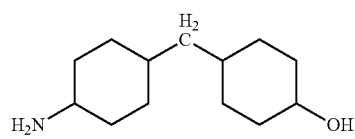 [SMILES: NC1CCC(CC2CCC(O)CC2)CC1]

-continued

| Ingredient: | CAS No. | Range (%) |
|---|---|---|
| 3. ("1/2-PACM") | 26480-77-5 | 0-30% |
| 4. ("Three Ring") | 25131-42-4 | 0-50% |
| 5. ("Three Ring") | N.A. | 0-40% |
| 6. 4-[(4-aminocyclohexyl)methyl]-N-[4-[(4-aminocyclohexyl)methyl]cyclohexyl] | 69868-18-4 | 0-35% |

In certain embodiments, the MPCA alkylates comprises at least one of or all of the above major ingredients, 1, 2, 3, 4, 5, 6, and combinations thereof.

The MPCA alkylates replace up to an average of one hydrogen per nitrogen with the alkylate fragments discussed. Replacement of more than an average of one hydrogen atom per nitrogen atom may result in an unacceptable level of chain terminating molecules with respect to reaction with isocyanate and may also result in poor performance of the resultant polymer in terms of physical properties and/or chemical resistance. Generally, a replacement of greater than 20% may result in an unacceptable loss in properties and/or performance.

The isocyanate-reactive components comprising the B-side of the spray polyurea system include predominantly amine-functional chain extenders and crosslinkers, but may also include a portion of polyols or other isocyanate-reactive chain extenders and crosslinkers. The distinction being the terms "chain extender" and "cross linker" is functionality of the isocyanate reactive moiety, e.g., chain extenders have a functionality of 2 whereas cross linkers have functionality >2. Commonly used amines include, but are not limited to, diethyl-toluenediamine (DETDA, also known as E100 from Albermarle), dimethylthiotoluenediamine (also known as E300 from Albermarle), alkyl methylenedianiline (alkyl MDA from Unilink products), and any one of a series of diaminopoly(propylene glycols) are also commonly used such as D230, D400 and D2000, where the numeric designator refers to the overall molecular weight. Higher functionality products with similar backbones are also commonly used, such as, for example, JEFFAMINE T5000, a 5000 molecular weight trifunctional poly(propylene glycol) triamine. Many other aromatic and aliphatic amines can also be used as components. Polyol components of functionality of at least 2 can be employed, such as poly(propylene glycol), ethylene oxide-capped polypropylene glycol, other polyethers, polyesters and polycaprolactones. In polyurea formulations the polyols are employed at a lower level than the total amine, usually at 20% or less of the B-side to maintain ability to designate the system as a pure polyurea. Polyurethane-polyurea hybrids employ polyols in the B-side of the spray formulation of >20%, and pure polyurethanes employ all polyols in the B-side of the system. The B-side may also contain a number of other components including plasticizers (isocyanate-reactive or non-reactive), fillers, pigments, and/or catalysts for example.

The A-side and B-sides can be formulated depending upon the needs of the final product. In certain embodiments, the A and B sides are blended in a plural-component spray equipment. Due to the fast nature of the polyurea cure, plural-component spray equipment may be used to mix, spray and apply the A and B sides of the polymeric composition onto a substrate to provide a coating or a coated substrate. In these embodiments, the polymeric composition is produced and applied to provide a coating onto a substrate using plural component spray equipment includes two or more independent chambers for holding a isocyanate component and an resin component. Flowlines connect the chambers to a proportioner which appropriately meters the two components (A-side and B-side) to heated flowlines, which can be heated by a heater to the desired temperature and pressurized. In certain embodiments, the spray operation can be conducted at a pressure ranging from about 1,000 psi and about 3,500 psi. In this or other embodiments, the spray operation can be conducted at temperatures ranging from about 120° to about 190° F. In still further embodiments, the temperature may be as low as room temperature. Once heated and pressurized, the two or more components are then fed to a mixing chamber located in the spray-gun where they are impingement mixed before being sprayed through the nozzle and onto the substrate. Most coating systems which use plural component spray equipment for application have very quick cure times and begin to cure as a polymer layer on the substrate within seconds. Suitable equipment may include GUSMER® H-2000, GUSMER® H-3500, and GUSMER® H-20/35 type proportioning units fitted with an impingement-mix spray guy such as the Grace FUSION, GUSMER® GX-7 or the GUSMER® GX-8 (all equipment available from Graco-Gusmer of Lakewood, N.J.). Functionally similar equipment is available from a wide range of manufacturers.

In one particular embodiment, the polymeric composition is made and applied using a GUSMER® H20/35 which is designed for a 1:1 volume mix and spray ratio. In the case of a 1:1 ratio, the A-side and B side are formulated such that upon mixing the curative will be present at 95% of the theoretical stoichiometry, however, this ratio can be altered within a +/−10% to achieve specific, desired results in the final polyurea. Commonly available A-side polyurea spray components are often in the 14-16% NCO range. However, the formulation of the A-side or isocyanate component is not limited to this particular % NCO range. The formulation latitude of the A and B side of the spray polyurea formulation is limited only by the available materials and the availability of suitable spray equipment to accommodate the resultant ratio (i.e., 1:10 to 10:1 for example).

Although plural-component spray equipment is described herein as a method of applying the light-stable polymeric compositions described herein, other methods may be used in preparing and forming the polymeric compositions. For example, the polymeric composition may be formed using compression molding or injection molding processes, such as reaction injection molding (RIM) processes. Furthermore, if formulated into a slow-cure system, the polymeric composition can be applied via other techniques, such as but not limited to, roll-on, low-pressure spray, dip, or trowel techniques.

Illustrative, but non-limiting, examples are set forth below. In the following examples unless otherwise specified, area percent gas chromatography (GC) analysis was conducted using a 25 m long with a 0.17 micron film thickness HP-5 column. The test results in Tables III and IV for the physical properties of the polymeric coatings were obtained using the ASTM D-412 standard using a Die C test coupon at a pull a rate of 2 inches/minute. The tear strength was obtained using the ASTM D-624 standard.

EXAMPLES

Example 1A

Preparation of MPCA-Acetone Reductive Alkylate

Starting material of the mixed polycylcoaliphatic (MPCA) amines was analyzed using GC analysis and found to contain the following which is provided in weight percent:

| PACM | (Ingredient 1) | 5.4% |
|---|---|---|
| PaCM-OH | (Ingredient 2) | 4.9% |
| ½ PACM | (Ingredient 3) | 11.0% |
| 3 ring | (Ingredients 4 and 5) | 56.5% |
| Secondary amines | (Ingredient 6) | 21.7% |

The above mixture further included a catalyst or 10% palladium on carbon (50% wet) which brought the total weight percent of the mixture to 100%.

A 2198 gram (g) or 6.97 molar amount of the above MPCA mixture was combined with 1424 grams (24.55 moles) acetone, and rolled in a 2 gallon Nalgene container until the mixture was homogeneous to provide a pre-mixture of MPCA and acetone. A 6.0 g amount of palladium on carbon (Pd/C) catalyst was charged to a 1.5 gallon reactor followed by approximately 3572 grams of the pre-mixture of MPCA and acetone. The reactor was purged several times with nitrogen ($N_2$) and determined to be pressure-tight and then purged and leak-checked with hydrogen ($H_2$) at a pressure of 435 pounds per square inch (psi). The stir rate was set at 100 revolutions per minute (rpm) and the temperature was ramped to a temperature of 80° C. at which point the reactor was set at a constant 800 psi $H_2$ pressure. The reaction was allowed to proceed for approximately 21 hours while monitoring the $H_2$ ballast pressure. The rate of $H_2$ ballast pressure decrease indicated the reaction was substantially complete in approximately 8.4 hours. The crude reaction mixture was filtered to remove any catalyst not consumed in the reaction and then vacuum evaporated to provide the isopropyl MPCA. A Karl-Fischer water analysis indicated that there was 350 parts per million (ppm) water in the product. Amine titration results showed 6.77 meq/g (147.7 g/eqv) versus non-alkylated MPCA 112 g/eqv, indicating successful alkylation had occurred. The increase in equivalent weight of 36 indicates an alkylation level of approximately (36/42) 0.86 units per nitrogen.

Example 1B

Preparation of an MPCA-Acetone Reductive Alkylate

A 1 liter, stainless steel (SS) vessel was charged with 300 grams (0.95 m MPCA) from the Example 1A, 6.0 g 2% Pd/C catalyst, and 30 grams isopropyl alcohol. The mixture was heated to a temperature of approximately 60 to 70° C. and a pressure of 100 psi $H_2$ and then 190.8 grams (3.3 moles) acetone was added over a period of 10 minutes. The mixture was then heated to a maximum temperature of 130° C. and a maximum pressure of 800 psi $H_2$. Monitoring of the $H_2$ pressure showed significant uptake of $H_2$. This procedure was repeated using 260 g (0.82 moles) MPCA, 70 g isopropyl alcohol, and 165.4 g (2.85 moles) acetone. An additional ½ charge (3.0 g) of the 2% Pd/C catalyst was added. The two runs were combined and filtered in THF through a 0.2 μm filter at approximately 50° C. Gas Chromatographic analysis indicated the two runs each produced a complex mixture of products but resulted in the initial mix of eluents nearly disappearing and a new band of later eluting components appearing as is characteristic of an alkylated species. After stripping the solvent, the AEW was determined by titration to be 149 and the specific gravity to be 0.97. The AEW indicates an alkylation level of approximately (37/42) 0.88 per nitrogen.

Example 1C

Preparation of MPCA-MIBK Reductive Alkylate

An amount of 20.5 grams 10% Pd/C catalyst (50% wet) (3 wt % based on MPCA+MIBK) was charged to a one liter SS reactor, followed by 149.8 grams (0.48 m) MPCA dissolved in 165.75 grams (1.66 m) methyl isobutyl ketone (MIBK). The reactor was purged three times and leak checked with $N_2$, then purged three times and leak checked with $H_2$. The reaction mix was heated to 90° C. and charged with 100 psi $H_2$ connected to a $H_2$ ballast tank. The reaction was allowed to proceed 22 hours then the $H_2$ pressure raised to 800 psi and allowed to proceed an additional 5 hours. The crude reaction mixture was then filtered through 0.5 μm filter using a pressure filter apparatus, followed by removal of excess MIBK by vacuum evaporation. The GC analysis shown below in Table I indicated alkylation had occurred, and the amine titration showed 5.58 meg/g (AEW 179.2 g/eqv). The AEW indicates an alkylation level of (67/86) 0.78 per nitrogen.

TABLE I

| GC Area % analysis | | |
| --- | --- | --- |
| Retention time | MPCA | MIBK-alkylate |
| <26 minutes | 30.71 | 0 |
| 26-35 minutes | 0 | 89.01 |
| 35-40 minutes | 68.29 | 10.99 |

1) Data for peaks eluting at or before 40 minutes only.

Example 2

Preparation of a Polyurea Polymer Containing the MPCA—Methyl Isobutyl Ketone (MIBK) Reductive Alkylate A polyurea B-side or resin component was prepared which was comprised of 28% MPCA-methyl isobutyl ketone (MIBK) reductive alkylate which was prepared in a manner similar to Example 1C above, 8.4% E100 (provided by Aldermarle Corp.), 2% JEFFAMINE® T-5000, 31.5% JEFFAMINE® D2000 and 30% JEFFAMINE® SD-2001 (which is a Jeffamine D2000 alkylate). The A-side or isocyanate component was comprised of Rubinate 9480 (provided by Huntsman Corp.). Both A and B components were heated to approximately 160° F. and sprayed onto a waxed metal panel at a pressure of approximately 2500 psi, using a GUSMER® GX-7 impingement mix spray gun. Two sheets of approximate size 18"×18" were prepared, with one sheet being cured overnight (approximately 16 hours) at 70° C. and the second sheet being allowed to cure under ambient conditions for at least 30 days before testing. The plaque was observed to have a gel time of 4 seconds and a tack-free time of 7 seconds.

Example 3

Preparation of a Polyurea Polymer Containing the MPCA-Acetone Reductive Alkylate A polyurea B-side or resin component was prepared which was comprised of 25% MPCA-acetone reductive alkylate, 5.6% E100 (provided by Aldermarle Corp.), 2% JEFFAMINE® T-5000, 38% JEFFAMINE® D2000 and 30% JEFFAMINE® SD-2001 (a Jeffamine D2000 alkylate). The A-side or isocyanate component was comprised of Rubinate 9480 (Huntsman Corp.). Both A and B components were heated to approximately 160° F. and sprayed onto a waxed metal panel at a pressure of approximately 2500 psi, using a GUSMER® GX-7 impingement mix spray gun. Two sheets of approximate size 18"×18" were prepared, with one sheet being cured overnight (approximately 16 hours) at 70° C. and the second sheet being allowed to cure under ambient conditions for at least 30 days before testing. The plaque was observed to have a gel time of 4 seconds and a tack-free time of 7 seconds.

Example 4

Preparation of a Polyurea Polymer Containing an MPCA-Acetone Reductive Alkylate A polyurea B-side or resin component was prepared which was comprised of 27% MPCA-acetone reductive alkylate, 9% E300 (provided by Aldermarle Corp.), 3% JEFFAMINE® T-5000, 36% JEFFAMINE® D2000 and 25% JEFFAMINE® SD-2001 (a Jeffamine D2000 alkylate). The A-side or isocyanate component was comprised of Rubinate 9480 (Huntsman Corp.). Both A and B components were heated to approximately 160° F. and sprayed onto a waxed metal panel at a pressure of approximately 2500 psi, using a GUSMER® GX-7 impingement mix spray gun. A sheet of approximate size 18"×18" were prepared, with one sheet being cured overnight (approximately 16 hours) at 70° C. before testing. The plaque was observed to have a gel time of 18 seconds and a tack-free time of 29 seconds. Other measurements of the test coupon where obtained and are as follows: Hardness=94 Shore A using ASTM D-2240; Tensile strength=1936 psi; % Elongation=143; and 100% Modulus=1616 psi using ASTM D-412; Die C tear=352 pli using ASTM D-624; and Split tear=44 pli using ASTM D-470.

Example 5

Preparation of a Polyurea Polymer Containing MPCA (Non-Alkylated)

A polyurea part B amine resin blend component was prepared consisting of a mixture of 7% MPCA, 5.6% E100, 2% Jeffamine T-5000, 38% Jeffamine D2000 and 30% Jeffamine SD-2001 (a Jeffamine D2000 alkylate). The A-side or isocyanate component was comprised of Rubinate 9480 (Huntsman Corp.). Both A and B components were heated to approximately 160 F and sprayed onto a waxed metal panel at a pressure of approximately 2500 psi, using a GUSMER® GX-7 impingement mix spray gun. Two sheets of approximate size 18"×18" were prepared (6 sec gel time, 12 sec tack-free time), with one sheet being cured overnight (approximately 16 hours) at 70° C. and the second sheet being allowed to cure under ambient conditions for several weeks before testing.

Example 6

Preparation of a Polyurea Polymer Containing MPCA (Non-Alkylated)

A polyurea part B amine resin blend component was prepared consisting of a mixture of 5% MPCA, 23.9% E100, 71.1% Jeffamine D2000. The A-side or isocyanate component was comprised of Polyshield part A (provided by SPI corp.). Both A and B components were heated to approximately 160° F. and sprayed onto a waxed metal panel at a pressure of approximately 2500 psi, using a GUSMER® GX-7 impingement mix spray gun. One sheet of approximate size 18"×18" was prepared and cured approximately one week at ambient conditions then 16 hours at 70° C. before testing. The plaque was observed to have a gel time of 2 seconds and a tack-free time of 4 seconds.

Example 7

Preparation of a Polyurea Polymer Containing Alkylated MPCA (Acetone Reductive-Alkylate)

A polyurea part B amine resin blend component was prepared consisting of a mixture of 15% MPCA-acetone reductive alkylate, 19% E100, 66% Jeffamine D2000. Polyshield part A (SPI corp.) was used as the A (or isocyanate-containing) component. Both A and B components were heated to approximately 160° F. and sprayed onto a waxed metal panel at a pressure of approximately 2500 psi, using a GUSMER® GX-7 impingement mix spray gun. One sheet of approximate size 18"×18" was prepared and cured approximately one week at ambient conditions then 16 hours at 70° C. before testing. The plaque was observed to have a gel time of 2 seconds and a tack-free time of 4 seconds.

Comparative Example A

A polyurea plaque of a commercially available material, Polyshield HT, which was obtained from Specialty Products, Inc. of Lakewood, Wash. ("SPI HT"), was prepared in a fashion similar to Example 2 for comparison.

Comparative Example B

A polyurea plaque of a commercially available material, EnviroLastic AR425, which was obtained from the General Polymers division of The Sherwin-Williams Company of Cincinnati, Ohio, was prepared in a fashion similar to Example 2 for comparison.

Comparative Example C

A polyurea plaque of a commercially available material, Polyshield SS-100, which was obtained from Specialty Products, Inc. of Lakewood, Wash. was prepared in a fashion similar to Example 2 for comparison. The gel time was 4 seconds and the tack-free time was 8 seconds.

Comparative Examples D, E, F, and G

Comparative Examples D, E, F, and G were prepared according to the reference article Reddinger, Jerry L.; Hillman, Kenneth M., "Tuning the Properties of Polyurea Elastomer Systems using Raw Material Selection and Processing Parameter Modulation", PU Latin America 2001, International Polyurethanes Conference & Exhibition for Latin America, Conference Papers, Sao Paulo, Brazil, Aug. 28-30, 2001 (2001), P32/1-P32/7. CODEN: 69COBM CAN 137: 264227 AN 2002:357450 CAPLUS.

The A-side of the formulation of comparative examples D through G was MDI-based with a % NCO of 15.4%, such as Rubinate® 9480, a quasi prepolymer described as having high 2,4-MDI content. Example G was a MDI quasi prepolymer with a % NCO of 19.6%.

The B-side of the formulation of the comparative examples is set out below in Table II. In each case, the polyurea elastomer was prepared using a 1:1 volume ratio of the A-side to the B-side with a weight ratio of approximately 1.1 to 1.15/1.

TABLE II

| | B-Side Component of Comparative Examples D through G | | | | | |
|---|---|---|---|---|---|---|
| Comp. Ex. | Jeffamine® D2000 | Jeffamine® T5000 | Jeffamine® D400 | Unilink® 4200 | DETDA | Iso Index |
| D | 65.68 | 5.57 | | | 28.76 | 1.05 |
| E | 57.45 | 10.64 | | 10.64 | 21.28 | 1.10 |
| F | 33.54 | 10 | 20 | 15 | 21.5 | 1.10 |
| G | 52.02 | 5.33 | | | 29.85 | 12.79 | 1.05 |

Comparison of the Polymeric Compositions

Chemical swell data in Table V was obtained in the following manner. Coupons of dimension 1"×3" were cut from sprayed plaques of ~1/16" in thickness. The individual coupons were weighed (dry) and fully immersed in the indicated liquid in Table V. After the time period specified, the coupons were removed from the liquid, blotted dry and weighed. The difference in the weight after immersion minus the starting weight divided by the starting weight is the reported percentage weight change.

The three commercial spray polyurea formulations, Envirolastic AR425 from Sherwin-Williams Co., Polyshield SS-100 and Polyshield HT both from SPI, were obtained from the manufacturers in two part formulations and sprayed following manufacturers recommendations. The plaques were cured overnight at 70° C. before testing, unless otherwise indicated.

The data in the Tables III through V show that the MPCA alkylates can be easily formulated to provide physical properties similar to those of a wide selection of formulated polyurea systems. In addition, the chemical swell data show both MPCA alkylates to have better chemical swell resistance to jet fuel than all of the commercial polyurea formulations evaluated. Both alkylates also showed much better resistance to $H_2SO_4$ than the commercial formulations. Additional improvements were also noted, for example the MPCA-MIBK formulation showed outstanding resistance to HCl, much better than two of the commercial formulations and similar to the third. The comparison of the MPCA-MIBK formulation to the AR425 polymeric formulation (which has similar HCl resistance) shows the MPCA-MIBK formulation to have better resistance to all of the remaining chemicals tested which shows the unique ability to match specific chemical resistance targets while improving upon broad spectrum chemical resistance. The non-alkylated MPCA was also shown to be able to be formulated into a spray polyurea system. However, for certain embodiments, the higher reaction rate may limit the amount of non-alkylated MPCA that can be used in the total polyurea formulation.

TABLE III

Comparison of Physical Properties of Polymeric Compositions Described Herein

| Ex. | Description of Curing Agent | Shore A hardness | Ultimate Tensile (psi) | Elongation @ break (%) | 100% modulus | 200% modulus | 300% modulus | Die C tear (lbf/in) | Split Tear |
|---|---|---|---|---|---|---|---|---|---|
| 5 | MPCA non-alkylated | 93 | 2315 | 358 | 1045 | 1375 | 1894 | 420 | 91 |
| 7 | MPCA alkylated | | 2560 | 182 | 1597 | | | 501 | |
| 3 | MPCA-acetone (FC)[1] | 93 | 2433 | 197 | 1669 | — | — | 514 | 74 |
| 3 | MPCA-acetone (ambient)[2] | 94 | 2393 | 194 | 1819 | — | — | 502 | 54 |
| 2 | MPCA-MIBK (FC)[1] | 93 | 2549 | 260 | 1610 | 2051 | — | 538 | 78 |
| 2 | MPCA-MIBK (ambient)[2] | 95 | 2670 | 234 | 1845 | 2379 | — | 532 | 70 |
| 6 | MPCA non-alkylated | | 2426 | 145 | 1808 | | | 474 | |
| 4 | MPCA Acetone alkylate | 94 | 1936 | 143 | 1616 | | | 352 | 44 |

(FC)[1]: Sheet was cured overnight (approximately 16 hours) at 70° C.
(ambient)[2]: Sheet was cured under ambient conditions for at least 30 days before testing

TABLE IV

Comparison of Physical Properties of Comparative Prior Art Compositions

| Comp. Ex. | Ultimate Tensile (psi) | Elongation @ break (%) | 100% modulus | 200% modulus | 300% modulus | Die C tear (lbf/in) | Split Tear | Gel time | Tack-free time |
|---|---|---|---|---|---|---|---|---|---|
| D | 2488 | 467 | 1212 | — | 1823 | 505 | — | 4 | 7 |
| E | 2662 | 532 | 1173 | — | 1753 | 482 | — | 5.5 | 10 |
| F | 2772 | 268 | 1946 | — | — | 541 | — | 3.5 | 6.5 |
| G | 2128 | 529 | 1027 | | 1471 | 456 | | 7 | 12.5 |
| A | 3757 | 513 | 1112 | 1458 | 1932 | 565 | — | | |
| B | 2090 | 403 | 1063 | 1323 | 1688 | 421 | 89 | | |
| C | 2860 | 226 | 1397 | | | 467 | | | |

TABLE V

Chemical Swell Data (Measured in Percent Weight Gain after 24 hour, 72 hour, and 7 day exposure)

| Ex. | Gas | Jet | Xylene | Methanol | $H_2SO_4$ | HCL |
|---|---|---|---|---|---|---|
| 3 | 37 (24 hr) | 4.8 (24 hr) | 90 (24 hr) | 80 (24 hr) | 18 (24 hr) | 3 (24 hr) |
| | 43 (72 hr) | 9 (72 hr) | 109 (72 hr) | 91 (72 hr) | 35 (72 hr) | 6 (72 hr) |
| | 46 (7 day) | 13 (7 day) | 118 (7 day) | 97 (7 day) | 57 (7 day) | 16 (7 day) |
| 2 | 36 (24 hr) | 5 (24 hr) | 92 (24 hr) | 70 (24 hr) | 20 (24 hr) | 0.7 (24 hr) |
| | 41 (72 hr) | 10 (72 hr) | 102 (72 hr) | 75 (72 hr) | 41 (72 hr) | 1.2 (72 hr) |
| | 43 (7 day) | 14 (7 day) | 108 (7 day) | 78 (7 day) | 68 (7 day) | 2.6 (7 day) |
| 6 | 21 (24 hr) | 2.8 (24 hr) | 60 (24 hr) | 47 (24 hr) | 19.5 (24 hr) | 9.5 (24 hr) |
| | 27 (72 hr) | 5.3 (72 hr) | 49 (72 hr) | 39 (72 hr) | 40 (72 hr) | 22 (72 hr) |
| | 22 (7 day) | 8.8 (7 day) | 43 (7 day) | 25 (7 day) | 64 (7 day) | 31 (7 day) |
| 7 | 20.5 (24 hr) | 3.4 (24 hr) | 57 (24 hr) | 41 (24 hr) | 18.4 (24 hr) | 9.1 (24 hr) |
| | 27 (72 hr) | 6.3 (72 hr) | 44 (72 hr) | 32 (72 hr) | 37 (72 hr) | 21 (72 hr) |
| | 20 (7 day) | 9.4 (24 hr) | 38 (7 day) | 22 (7 day) | 56 (7 day) | 29 (7 day) |
| Comp. Ex. B | 59 (24 hr) | 12 (24 hr) | 135 (24 hr) | 90 (24 hr) | 28 (24 hr) | 1.4 (24 hr) |
| | 67 (72 hr) | 19 (72 hr) | 146 (72 hr) | 94 (72 hr) | 54 (72 hr) | 1.7 (72 hr) |
| | 71 (7 day) | 22 (7 day) | 152 (7 day) | 95 (7 day) | 84 (7 day) | 2.3 (7 day) |
| Comp. Ex. A | 41 (24 hr) | 13 (24 hr) | 88 (24 hr) | 70 (24 hr) | 49 (24 hr) | 6 (24 hr) |
| | 44 (72 hr) | 17 (72 hr) | 95 (72 hr) | 71 (72 hr) | 92 (72 hr) | 10 (72 hr) |
| | 45 (7 day) | 19 (7 day) | 99 (7 day) | 71 (7 day) | 98 (7 day) | 16 (7 day) |
| Comp. Ex. C | 21.3 (24 hr) | 4.7 (24 hr) | 56 (24 hr) | 42 (24 hr) | 26 (24 hr) | 14 (24 hr) |
| | 28 (72 hr) | 8.5 (72 hr) | 41 (72 hr) | 34 (72 hr) | 54 (72 hr) | 28 (72 hr) |
| | 21 (7 day) | 11 (7 day) | 34 (7 day) | 23 (7 day) | 82 (7 day) | 34 (7 day) |

The invention claimed is:

1. A polymeric composition comprising:
an isocyanate component, and
a resin component comprising an organic compound having the following Formula I:

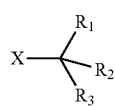

Formula I wherein $R_1$, and $R_2$ are each independently selected from a hydrogen atom, an alkyl group comprising from 1 to 20 carbon atoms, an aryl group comprising from 3 to 12 carbon atoms, an aralkyl group comprising from 3 to 12 carbon atoms and combinations thereof, and $R_3$ is independently selected from an alkyl group comprising from 3 to 12 carbon atoms, an aralkyl group comprising from 3 to 12 carbon atoms and combinations thereof, provided that there is at least one alkyl group within Formula I, and X is a methylene bridged polycycloaliphatic amine, wherein the —$CR_1R_2R_3$ group is connected to a nitrogen atom of the methylene bridged polycycloaliphatic amine and wherein the methylene bridged polycycloaliphatic amine is comprised of at least one selected from the group consisting of:

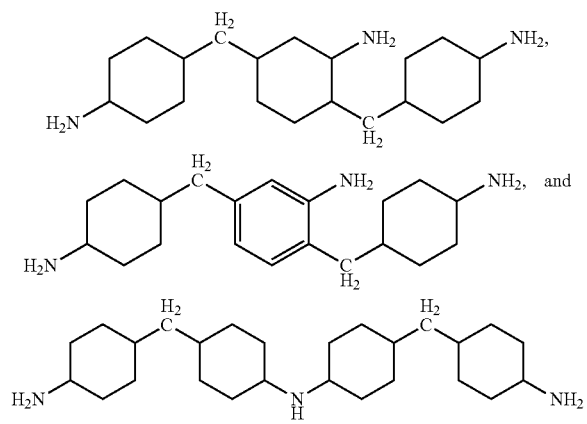

and combinations thereof.

2. A method for preparing a polymeric composition, the method comprising:
providing an isocyanate component;
providing a resin component comprising an organic compound having the following Formula I:

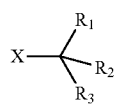

Formula I wherein $R_1$, and $R_2$ are each independently selected from a hydrogen atom, an alkyl group comprising from 1 to 20 carbon atoms, an aryl group comprising from 3 to 12 carbon atoms, an aralkyl group comprising from 3 to 12 carbon atoms and combinations thereof, and $R_3$ is independently selected from an alkyl group comprising from 3 to 12 carbon atoms, an aralkyl group comprising from 3 to 12 carbon atoms and combinations thereof, provided that there is at least one alkyl group within Formula I, and X is a methylene bridged polycycloaliphatic amine, wherein the —$CR_1R_2R_3$ group is connected to a nitrogen atom of the methylene bridged polycycloaliphatic amine and wherein the methylene bridged polycycloaliphatic amine is comprised of at least one selected from the group consisting of:

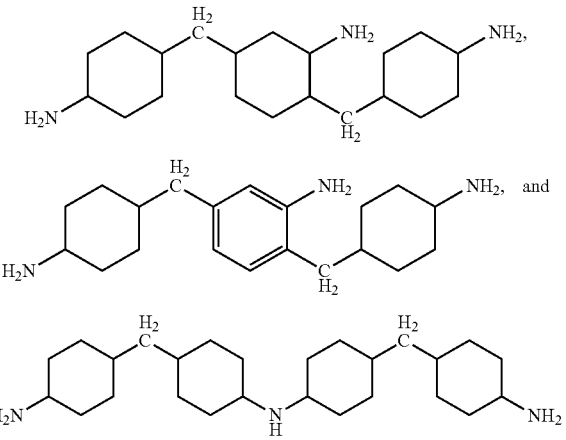

and combinations thereof; and
mixing the at least a portion of the isocyanate component with at least a portion of the resin component wherein the at least a portion of the resin component reacts with the at least a portion of the isocyanate component to provide the polymeric composition wherein the volume ratio of the isocyanate component to the resin component in the polymeric composition is any ratio in the range of from about 1.00:1.00 to about 1.20:1.00.

3. A polymeric composition comprising:
an alkylate of a methylene bridged polycycloaliphatic amine wherein the methylene bridged polycycloaliphatic amine is comprised of at least one selected from the group consisting of:

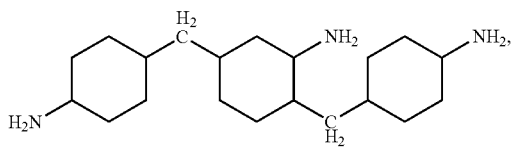 [SMILES: NC1CCC(CC2CCC(CC3CCC(N)CC3)C(N)C2)CC1]

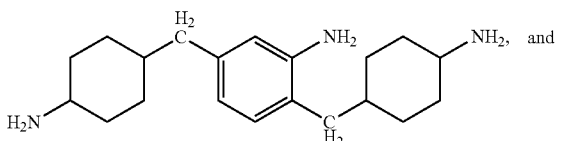

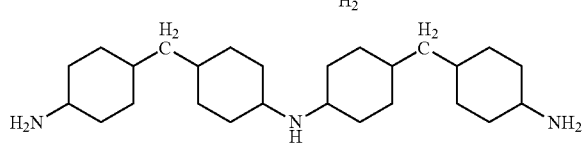

and combinations thereof.

4. The polymeric composition of claim 3 wherein the methylene bridged polycycloaliphatic amine comprises:
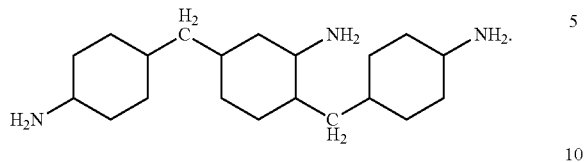
5. The polymeric composition of claim 3 wherein the methylene bridged polycycloaliphatic amine comprises:
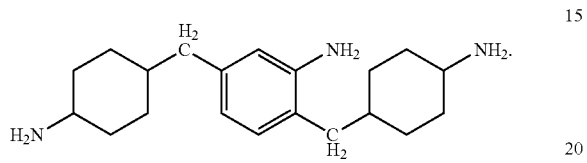
6. The polymeric composition of claim 3 wherein the methylene bridged polycycloaliphatic amine comprises:
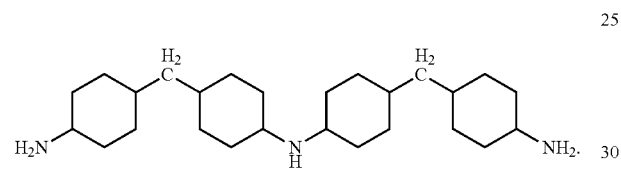
* * * * *